(12) United States Patent
Kojo et al.

(10) Patent No.: US 8,380,047 B2
(45) Date of Patent: Feb. 19, 2013

(54) VIDEO EDITING SYSTEM, VIDEO EDITING SERVER AND COMMUNICATION TERMINAL

(75) Inventors: Yu Kojo, Kawasaki (JP); Masami Yabusaki, Kashiwa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 902 days.

(21) Appl. No.: 12/479,276

(22) Filed: Jun. 5, 2009

(65) Prior Publication Data

US 2010/0014826 A1    Jan. 21, 2010

(30) Foreign Application Priority Data

Jun. 6, 2008    (JP) .................................. 2008-149559

(51) Int. Cl.
*H04N 5/93*    (2006.01)
(52) U.S. Cl. ....................................................... 386/278
(58) Field of Classification Search .......................... None
See application file for complete search history.

(56) References Cited

U.S. PATENT DOCUMENTS

| | | | |
|---|---|---|---|
| 5,649,171 A * | 7/1997 | Craven et al. .................... | 703/23 |
| 5,978,846 A | 11/1999 | Kimishima | |
| 6,061,683 A | 5/2000 | Alonso | |
| 6,085,020 A | 7/2000 | Saito et al. | |
| 6,151,621 A | 11/2000 | Colyer et al. | |
| 7,280,692 B2 | 10/2007 | Fushiki et al. | |
| 2004/0125126 A1* | 7/2004 | Egawa et al. .................. | 345/716 |
| 2004/0218899 A1* | 11/2004 | Oyama et al. .................... | 386/46 |
| 2005/0064858 A1 | 3/2005 | Makela et al. | |
| 2005/0210392 A1* | 9/2005 | Koide et al. .................... | 715/751 |
| 2006/0269220 A1* | 11/2006 | Ishido ............................. | 386/52 |
| 2007/0074104 A1* | 3/2007 | Kotzin .......................... | 715/513 |

FOREIGN PATENT DOCUMENTS

EP    0 889 636 A2    1/1999
(Continued)

OTHER PUBLICATIONS

Japanese Office Action w/Translation, dated Jan. 5, 2011, total of 7 pages.

(Continued)

*Primary Examiner* — Thai Tran
*Assistant Examiner* — Sunghyoun Park
(74) *Attorney, Agent, or Firm* — Crowell & Moring LLP

(57) ABSTRACT

There are provided a video editing system, a video editing server and a communication terminal which enable simultaneous editing operations for editing a video content to be performed by plural persons, without generating a file in which a content of the editing has been reflected in the video content. One of a plurality of editing terminals in a synchronized state generates an edit command for editing a video content with an edit command generating section, based on an editing operation by a user from a terminal operating section, and transmits the generated edit command to a video editing server via an information transmitting/receiving section. If the edit command is received via an information transmitting/receiving section, the video editing server transmits the received edit command to another editing terminal in the synchronized state, via an edit command synchronizing section. If the edit command is received via the information transmitting/receiving section, another editing terminal in the synchronized state displays a content of the edit command on a screen displaying section via an edit command displaying section.

10 Claims, 6 Drawing Sheets

FOREIGN PATENT DOCUMENTS

| | | |
|---|---|---|
| EP | 1 881 424 A2 | 1/2008 |
| JP | 08-289246 | 11/1996 |
| JP | 09-106379 A | 4/1997 |
| JP | 09-190412 A | 7/1997 |
| JP | 10-51718 | 2/1998 |
| JP | 10-303893 A | 11/1998 |
| JP | 2000-30073 A | 1/2000 |
| JP | 2000-172649 A | 6/2000 |
| JP | 2001-256210 | 9/2001 |
| JP | 2002-532996 | 10/2002 |
| JP | 2004-064789 | 2/2004 |
| JP | 2006-157363 | 6/2006 |
| JP | 2006-339878 A | 12/2006 |
| JP | 2007-150994 | 6/2007 |
| WO | WO 00/36516 | 6/2000 |
| WO | WO 2004/043032 A2 | 5/2004 |
| WO | WO 2005/043311 A2 | 5/2005 |

OTHER PUBLICATIONS

European Patent Office Summons to Oral Proceedings, dated Jun. 11, 2012, 11 pages.

Thomas Berlage, et al., "A Framework for Shared Applications With a Replicated Architecture", GMD (German National Research Center for Computer Science), Proceedings of the Annual ACM Symposium on User Interface Software and Technology, Nov. 3, 1993, pp. 249-257, XP-002213859, Atlanta, Georgia.

European Search Report, dated Jun. 11, 2012, 11 pages.

Thomas Berlage, et al., "A Framework for Shared Applications With a Replicated Architecture", GMD (German National Research Center for Computer Science), Proceedings of the Annual ACM Symposium, on User Interface Software and Technology, Nov. 3, 1993, pp. 249-257, XP-002213859, Atlanta, Georgia.

Brief Communication of European Patent Office, dated Sep. 13, 2012, 3 pages.

* cited by examiner

VIDEO EDITING SYSTEM, VIDEO EDITING SERVER AND COMMUNICATION TERMINAL

BACKGROUND OF THE INVENTION

1. Field of the Invention

The present invention relates to a video editing system, a video editing server and a communication terminal, so that at least two persons can edit a video content.

2. Description of the Related Art

As a conventional technique for allowing at least two persons to edit an identical content, for example, JP 2000-30073 A describes that, in a system in which an editing server and multiple client computers are communicable with one another, when one client computer edits image data and transmits information on the edited image to an image server, the image server includes edit image information transmitting means for transmitting information on the edited image that has been transmitted from a client computer to a single or multiple client computers. The above described single or multiple client computers, each include image re-editing means for, based on the information on the edited image that has been transmitted from the image server, re-editing the edited image generated by the above described single client computer, and re-edit information transmitting means for transmitting re-edit information on the re-edited image that has been re-edited by the image re-editing means, to the image server. Thereby, the identical image can be edited by different client computers.

In addition, conventional techniques for video editing are described in JP 2002-532996 A, JP 2007-150994 A, and JP 2001-256210 A. The technique described in JP 2002-532996 A enables the video editing without imposing a burden on a client, by performing on the server side a process based on commands transmitted from a client to a server via a network. In other words, in the client, a video editing interface is installed for causing a user to perform a predetermined set of commands, to transmit the predetermined set of commands to the server, and to receive its result for display. All or most of actual data processing is performed in the server. The server operates based on a multimedia processing command that has been received from the client, so as to make a processed multimedia object available to a client computer via the network.

Further, JP 2007-150994 A describes that a server reads a video content to be edited, from a storage device, generates differential information on an editing screen to transmit the differential information to a terminal, so that the terminal generates the editing screen based on the differential information and transmits user operation information to the server, and the server edits the video content based on the operation information.

Moreover, JP 2001-256210 A describes that, when a book select command is sent from one terminal to a system device, data for one selected page is displayed on the terminal, and when the terminal transmits an edit command, the system device updates book data in a book data storing section and also returns an update command. If another terminal is editing an identical page, the same update command is returned and mirror books in another terminal also updated. Therefore, at least two terminals are simultaneously capable of editing an identical file via a network, and also, an edited content of is directly reflected in a file being opened in another terminal simultaneously editing the content.

As described above, conventionally, when at least two persons use a video editing device of a client-server type so as to attempt editing of the video content, only one client is capable of editing an identical video content at a time. If at least two persons simultaneously edit a content, there is only one method in which, when one user terminates an editing process, reflects the edited content in the video content, and creates a file. Subsequently, another user edits the above described file.

SUMMARY OF THE INVENTION

The present invention has been made in view of the above circumstances, and it is an object of the present invention to provide a video editing system, a video editing server and a communication terminal which enable simultaneous editing operations for editing a video content by a plurality of people, without generating a file in which a content of the editing has been reflected in the video content.

In order to solve the above described problems, according to one aspect of the present invention, there is provided a video editing system comprising: a plurality of communication terminals (a plurality of editing terminals 30), in a synchronized state, simultaneously capable of editing a common video content via a video editing interface; and a video editing server (10) that controls editing of the common video content to be performed by the plurality of communication terminals, wherein: each of the plurality of communication terminals comprises: an edit command generating section (3031) that generates an edit command for editing the video content; an information transmitting/receiving section (301) that transmits the edit command generated by the edit command generating section to the video editing server, and that receives the edit command for editing the video content from another communication terminal in the synchronized state, via the video editing server; and an edit command displaying section (3032) that displays a content of the edit command received by the information transmitting/receiving section, and the video editing server comprises: an edit command synchronizing section (1032) that transmits the edit command to another communication terminal in the synchronized state, when the edit command for editing the video content is received from one of the plurality of communication terminals in the synchronized state.

According to an aspect of the present invention, since the content of the edit command transmitted by each of the other communication terminals in the synchronized state can be displayed on the plurality of communication terminals in the synchronized state, each user is able to learn what kind of editing is being performed by other users who are using the communication terminals and simultaneously editing the video content, without generating the file in which the content of the editing has been reflected in the video content. This allows multiple persons to perform the simultaneous editing operations.

According to another aspect of the present invention, there is provided a video editing server that relays a communication between a plurality of communication terminals, in a synchronized state, simultaneously capable of editing a common video content via a video editing interface, the video editing server comprising: an edit command synchronizing section that transmits an edit command to another communication terminal in the synchronized state, when the edit command is received from one of the plurality of communication terminals in the synchronized state to perform a synchronization process of causing said another communication terminal to display a content of the edit command.

According to an aspect of the present invention, since the content of the edit command transmitted by each of the other communication terminals in the synchronized state can be displayed on the plurality of communication terminals in the synchronized state, each use is able to learn know what kind of editing is being performed by the other users who are using the communication terminals and simultaneously editing the video content, without generating the file in which the content of the editing has been reflected in the video content. This allows multiple persons to perform the simultaneous editing operations.

The above-described video editing server may further include an editing terminal calling section (1031) that transmits a call request to a communication terminal which is not connected to the video editing server and which is to be brought into the synchronized state, wherein a connection to the communication terminal is initiated by receiving a response to the call request from the communication terminal.

According to an aspect of the present invention, the video editing server can be connected to the communication terminal by transmitting the call request to the communication terminal to be put into the synchronized state and receiving the response. Therefore, even if the communication terminal is not connected to the video editing server, the user of the communication terminal is able to start the simultaneous editing of the video content.

The above video editing server may further include an edit command accumulating section (1034) for accumulating the edit commands received from the plurality of communication terminals in the synchronized state, wherein when a communication terminal attempting to edit the predetermined video content is newly connected while the plurality of communication terminals in the synchronized state are editing a predetermined video content, the edit command synchronizing section brings the newly connected communication terminal into the synchronized state by transmitting to the newly connected communication terminal the edit command, for editing the predetermined video content, which have been accumulated in the edit command accumulating section.

According to an aspect of the present invention, while multiple communication terminals in the synchronized state are editing the predetermined video content, even if another communication terminal is newly connected, the communication terminal can be brought into the synchronized state. Therefore, the user of the communication terminal is able to perform simultaneously the editing operation for editing the predetermined video content in the middle of the editing operation.

In the above-described video editing server, when the above edit command synchronizing means has transmitted the edit command to the communication terminal in the above described synchronized state, if the above described edit command synchronizing means has not been able to perform the synchronization process of causing the communication terminal to display the content of the above described edit command, the above described edit command synchronizing means retransmits the above described edit command until the above described synchronization process can be normally performed.

According to an aspect of the present invention, the synchronized state of the communication terminals in the synchronized state can be maintained.

In the above-described video editing server, wherein the edit command synchronizing section may determine whether or not the synchronization process is performed based on a predefined editing rule, when the edit command is received from the communication terminal in the synchronization state.

According to an aspect of the present invention, the synchronization process can be performed, while the synchronized state is maintained, according to the predefined editing rule.

In the above-described video editing server, wherein the predefined editing rule may include at least one of editing rules: an editing rule in which, in a case where the plurality of communication terminals in the synchronized state alternately edit the common video content and the communication terminal having an editing authority to edit the video content is alternately switched between the plurality of communication terminals, it is determined that the synchronization process is performed when the communication terminal which has transmitted the edit command does not have the editing authority at a time point when the communication terminal transmits the edit command; and another editing rule in which it is determined that the synchronization process cannot be performed when the plurality of communication terminals in the synchronized state simultaneously edit the video content and an inconsistency occurs, if two edit commands are simultaneously received and both of the two edit commands are reflected.

According to an aspect of the present invention, the synchronization process can be performed, while the synchronized state is being maintained, according to the predefined editing rule.

According to yet another aspect of the present invention, there is provided a communication terminal (editing terminal 30) that is one of a plurality of communication terminals and that edits a common video content via a video editing interface, the communication terminal comprising: an edit command generating section (3031) that generates an edit command for the video content; an information transmitting/receiving section (301) that transmits the edit command generated by the edit command generating section to a video editing server, and that receives the edit command for editing the video content from another communication terminal in the synchronized state, via the video editing server; and an edit command displaying section (3032) that displays a content of the edit command received by the information transmitting/receiving section.

According to an aspect of the present invention, the communication terminal is capable of transmitting the edit command from the communication terminal to another communication terminal, receive the edit command from another communication terminal, and thereby display the content of the edit command. Therefore, the user of the communication terminal is able to learn what kind of editing is being performed by another user who is simultaneously editing the video content, without generating the file in which the content of the editing has been reflected in the video content. This allows multiple persons simultaneous editing of editing the video content.

In the above-described communication terminal, the information transmitting/receiving section may receive a call request from a video editing system, when the communication terminal is not connected to the video editing system which relays the editing of the common video content to be performed by the plurality of communication terminals; and a connection to the video editing system is initiated by making a response to the call request received by the information transmitting/receiving section.

According to an aspect of the present invention, even if the communication terminal is not connected to the video editing system, the communication terminal is capable of starting the connection to the video editing system by responding to the call request, and the user of the communication terminal can start the simultaneous editing of the video content.

In the above-described communication terminal, when the communication terminal is connected to the video editing system in order to edit the predetermined video content while another communication terminal out of the plurality of communication terminals is editing a predetermined video content, the information transmitting/receiving section may receive from the video editing system the edit command, for editing predetermined video content, which have been transmitted from said another communication terminal until the communication terminal is connected to the video editing system.

According an aspect of to the present invention, even if the communication terminal is connected while the plurality of communication terminals are editing the predetermined video content, it is possible to receive the edit commands for the predetermined video content, which have been transmitted from another communication terminal until the communication terminal has been connected. This allows the user of the communication terminal to simultaneously perform the editing operation for editing the predetermined video content in the middle of the editing operation.

According to an aspect of the present invention, since the content of the edit command transmitted by each of the other communication terminals in the synchronized state can be displayed on the plurality of communication terminals in the synchronized state, the user is able to learn what kind of editing is being performed by other users who are using the communication terminals and simultaneously editing the video content, without generating the file in which the content of the editing has been reflected in the video content. This allows multiple persons to perform simultaneous editing operations for editing the video content.

DETAILED DESCRIPTION OF THE PREFERRED EMBODIMENT

Figure 1:
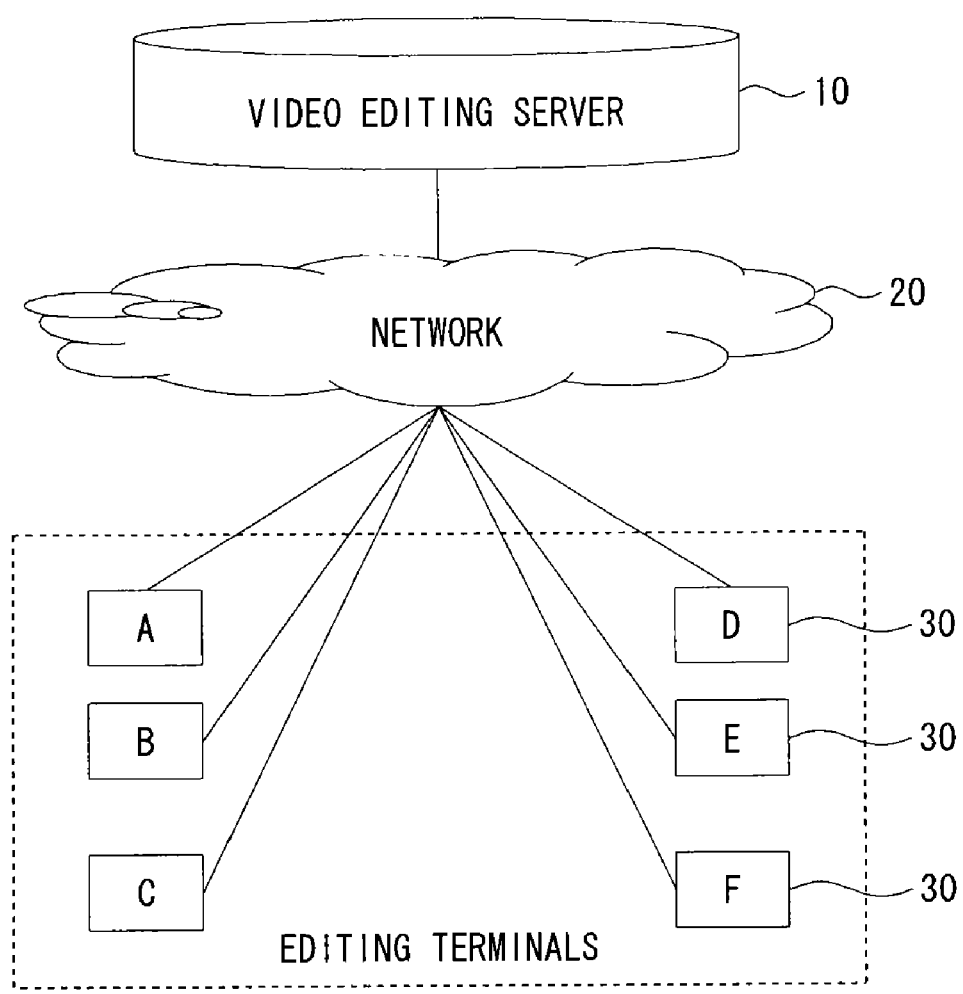
FIG. 1 is a configuration illustrative of a video editing system according to an embodiment of the present invention.

Hereinafter, embodiments of the present invention will be described with reference to the drawings. It should be noted that, in the following description, in the respective drawings to be referred, parts equivalent to those illustrated in other drawings are indicated by the same reference numerals.
(Overall Configuration)

FIG. 1 is an overall configuration illustrative of a video editing system according to an embodiment of the present invention. As illustrated in FIG. 1, the video editing system according to an embodiment of the present invention is configured to include a video editing server 10 for relaying an editing process for editing a video content, a plurality of editing terminals 30 through which users perform editing operations for editing the video content, and a network 20 for controlling communications among the video editing server 10 and the editing terminals 30. In the following description, when it is necessary to describe the plurality of editing terminals 30 to be distinguished from one another, the plurality of editing terminals 30 will be referred to as "editing terminals 30A, 30B, . . . ".
(Configuration of Video Editing Server)

Figure 2:
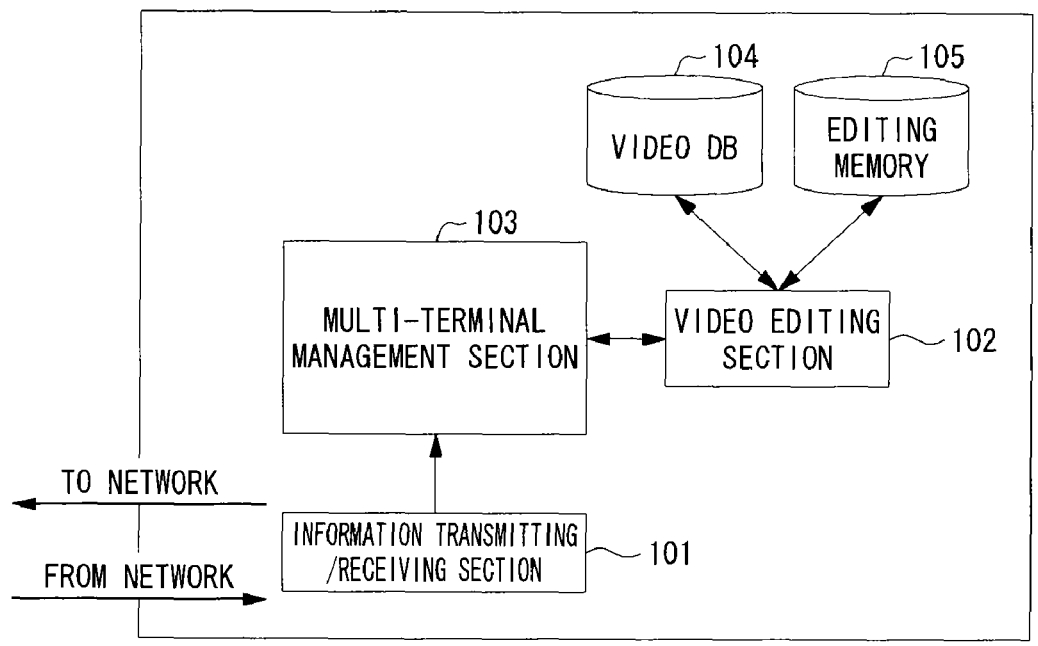
FIG. 2 is a configuration illustrative of a video editing server according to an embodiment of the present invention.

FIG. 2 is a configuration diagram illustrative of the video editing server 10 according to an embodiment of the present invention. As illustrated in FIG. 2, the video editing server 10 includes a video editing section 102, a multi-terminal management section 103, an information transmitting/receiving section 101, a video database (DB) 104, and an editing memory 105.

The information transmitting/receiving section 101 includes a communication interface, so as to transmit and receive various types of data such as video/image data, an edit command for editing the video content, an editing application start signal, and a response signal to the editing application start signal, between each of the editing terminals 30 and the multi-terminal management section 103.

The video editing section 102 uses the video DB 104 and the editing memory 105 to perform the editing process for editing the video content. The video DB 104 is a database for storing the video content. The video DB 104 transmits a part of the video content (video data) to be edited to the editing memory 105, according to a signal applied from the video editing section 102. Moreover, based on a registration signal applied from the editing terminal 30, the video DB 104 reflects the edited video data in the editing memory 105, into the video DB 104. The editing memory 105 is a temporary storage area used for editing the video content stored in the video DB 104.

The multi-terminal management section 103 has a function of calling the editing terminal 30 which is not connected to the video editing system, a function of synchronizing the edit command among the plurality of editing terminals 30 managed in a synchronized state, and the like.
(Configuration of Multi-Terminal Management Section)

Figure 3:
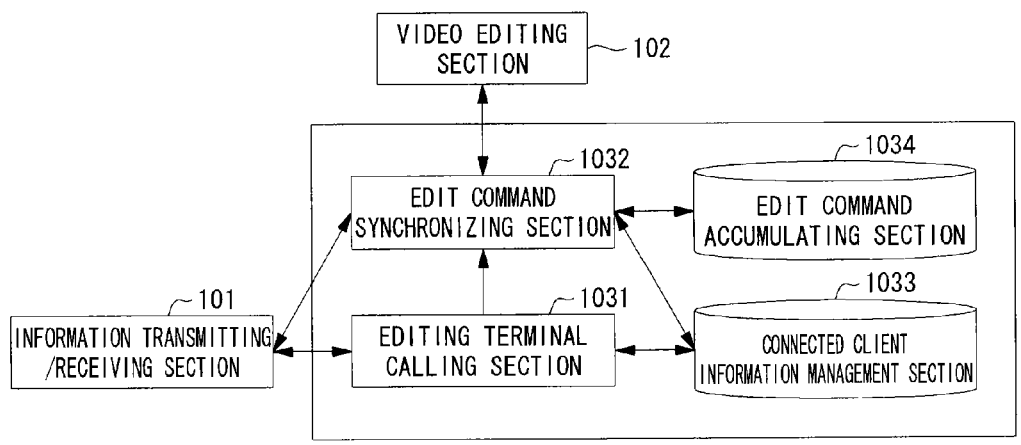
FIG. 3 is a block diagram illustrative of a functional configuration of a multi-terminal management section according to an embodiment of the present invention.

FIG. 3 is a block diagram illustrative of a functional configuration of the multi-terminal management section 103 in detail. As illustrated in FIG. 3, the multi-terminal management section 103 includes an editing terminal calling section 1031, an edit command synchronizing section 1032, a connected client information management section 1033, and an edit command accumulating section 1034.

The connected client information management section 1033 manages information on the editing terminals 30 connected to the video editing system (that is, the server 10), and the editing terminals 30 in the synchronized state, in which a common video content is editable.

Specifically, the connected client information management section 1033 stores in a memory information with which the editing terminals 30 connected to the video editing system can be identified, and information with which the editing terminals 30 in the synchronized state can be identified (manufacturing numbers of the editing terminals 30, identifiers linked with programs stored in the editing terminals 30, and arbitrary identifiers with which the users of the editing terminals 30 can be identified, such as user accounts).

In order to connect an editing terminal 30 which is not connected to the video editing system, to the video editing system, the editing terminal calling section 1031 transmits a call request to the above described editing terminal 30. In the present embodiment, as the call request, the editing application start signal for starting an editing application program stored in the editing terminal 30 is transmitted.

When receiving the response signal to the transmitted editing application start signal, the video editing server 10 starts connection with the above described editing terminal 30, and manages the identifier of the above described editing terminal 30 as the connected terminal, in the connected client information management section 1033.

When the edit command is received from an editing terminal 30 out of the plurality of editing terminals 30 managed in the synchronized state in the connected client information management section 1033, that is, out of the plurality of editing terminals 30 attempting to simultaneously edit a predetermined video content, the edit command synchronizing section 1032 performs a synchronization process of notifying remaining editing terminal or terminals 30 in the synchronized state, of the above received edit command. Simultaneously, the edit command synchronizing section 1032 accumulates the above described edit command in the edit command accumulating section 1034.

Each of the editing terminals 30 which has received the above described edit command from the video editing server 10 allows a user to recognize what kind of edit command has been issued from another editing terminal 30 in the synchronized state, by displaying a content of the above described edit command on an editing screen.

It should be noted that, in a case where the editing terminal 30 managed in the synchronized state is a terminal such as a cellular phone, which has a poor processing capacity or which is communicating in a bad communication environmental state, the video editing server 10 may perform a process of changing information to be transmitted, in accordance with the processing capacity or transmission capacity of the above described editing terminal 30. A conceivable example is to transmit the content of the edit command as text data, instead of transmitting the content of the edit command as the image data. According to the present embodiment, the edit command synchronizing section 1032 assumes the role of performing the process.

Simultaneous or alternate editing operations to be performed by the plurality of editing terminals 30 are accomplished under the control of the edit command synchronizing section 1032. In other words, when the plurality of editing terminals 30 simultaneously edit the video content, the edit command synchronizing section 1032 processes a bidirectional synchronization of the edit command so that inconsistency does not occur. When the plurality of editing terminals 30 alternately perform the editing process, the edit command synchronizing section 1032 performs the process so that the edit command from one editing terminal 30 is reflected and the other edit command is not reflected.

Whether the video content is simultaneously edited or alternately edited is determined, based on a predefined editing rule. When the edit command is received from one of the plurality of editing terminals 30 in the synchronized state, the edit command synchronizing section 1032 determines whether or not the synchronization process can be performed without an inconsistency based on the predefined editing rule. When it is determined that the synchronization process can be performed, the edit command synchronizing section 1032 performs the synchronization process. When it is determined that the synchronization process cannot be performed, the edit command synchronizing section 1032 rejects the above described edit command without performing the synchronization process.

As the predefined editing rule, there is an editing rule in which, in a case where the plurality of editing terminals 30 in the synchronized state alternately edit the common video content and the editing terminal 30 having an editing authority to edit the video content is alternately switched among the plurality of editing terminals 30, it is determined, at a time point when the editing terminal 30 transmits the edit command, that the synchronization process cannot be performed, if the editing terminal 30 which has transmitted the edit command does not have the editing authority. There is another editing rule in which it is determined that the synchronization process cannot be performed, if the plurality of editing terminals 30 in the synchronized state simultaneously edit the video content and the inconsistency occurs at a time point when two edit commands are simultaneously received and both of them are reflected. The case where the inconsistency occurs when two edit commands are simultaneously received and both of them are reflected includes a case where an edit command for cutting predetermined video data and an edit command for applying a mosaic process to the video data have been simultaneously received.

Moreover, when the edit command synchronizing section 1032 transmits the edit command to another editing terminal 30 in the synchronized state, if the edit command synchronizing section 1032 is not capable of completing the synchronization process of causing the above described editing terminal 30 to display the content of the edit command, because the editing terminal 30 is not capable of normally receiving the edit command or the like, the edit command synchronizing section 1032 periodically retransmits the edit command until the synchronization process is normally completed.

It should be noted that, instead of transmitting and receiving the edit command between or among the plurality of editing terminals 30 via the video editing server 10 and the network 20, a conceivable configuration is that the edit command is directly transmitted and received between or among the editing terminals 30 via the network 20. Alternatively, a short-range radio communication such as Bluetooth (registered trademark) or the like can also be used to directly transmit and receive the edit command between or among the editing terminals 30. However, if such a scheme is employed, it is necessary to provide the editing terminals 30 having functions corresponding to those of the edit command synchronizing section 1032, the edit command accumulating section 1034, and the connected client information management section 1033.

The edit command accumulating section 1034 accumulates the edit commands transmitted from the editing terminals 30, as an editing operation history. While the plurality of editing terminals 30 are performing the editing operations for editing the video content, when another editing terminal 30 attempting to edit the above described video content is newly connected to the video editing system, the above described accumulated edit commands for the video content are transmitted to the above described newly connected editing terminal 30. Thereby, the newly connected editing terminal 30 is brought into the state of synchronized synchronization with the plurality of editing terminals 30 that are editing the above described video content.

(Configuration of Editing Terminal)

Figure 4:
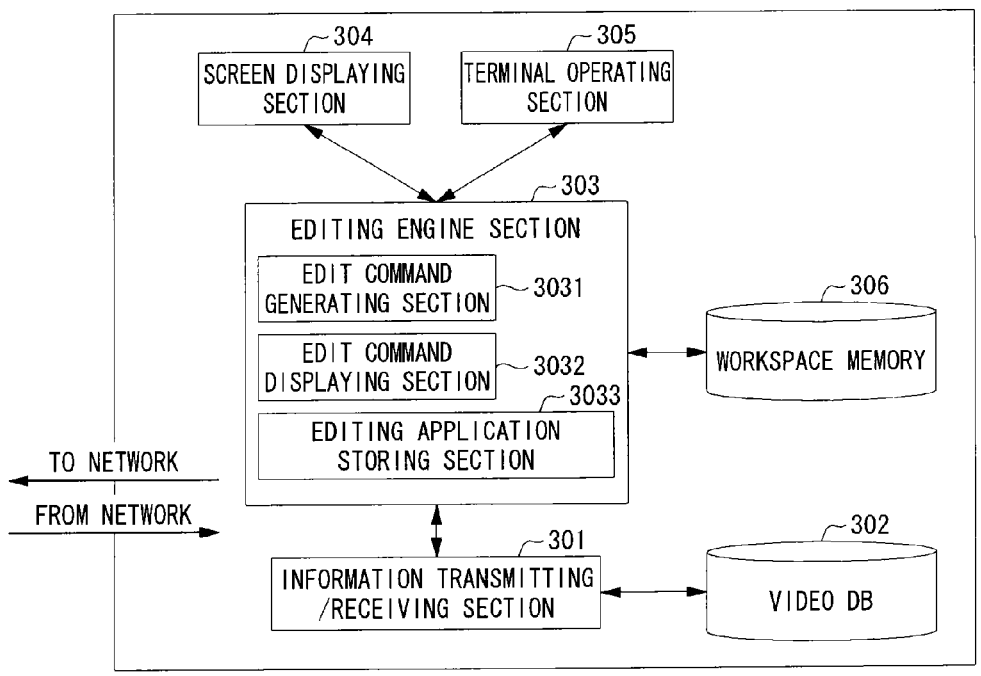
FIG. 4 is a configuration illustrative of an editing terminal according to an embodiment of the present invention.

FIG. 4 illustrates a configuration of the editing terminal 30 according to an embodiment of the present invention. As illustrated in FIG. 4, the editing terminal 30 includes a screen displaying section 304, a terminal operating section 305, an editing engine section 303, an information transmitting/receiving section 301, a workspace memory 306, and a video DB 302.

The screen displaying section 304 has a function of a video editing interface to display an image, a video, a video editing screen and the like, on a display, based on display data transmitted from the editing engine section 303.

The terminal operating section 305 includes operation keys, a pointing device and the like to notify the editing engine section 303 of operation information, based on the operation performed by the user.

The editing engine section 303 has a function achieved by a Central Processing Unit (CPU) of the editing terminal 30 executing a process according to the program stored in the memory. The editing engine section 303 displays the video editing screen on the display, receives the operation information based on the editing operation performed by the user, and controls the process for the video editing.

Moreover, in receipt of the editing application start signal from the video editing server 10, the editing engine section 303 starts a predetermined operation of prompting the user to perform the simultaneous editing of the predetermined video content. Specifically, the editing engine section 303 includes an edit command generating section 3031, an edit command displaying section 3032, and an editing application storing section 3033.

The edit command generating section 3031 generates the edit command to be transmitted to the video editing server 10, based on the editing operation performed by the user. The above described edit command is transmitted to the video editing server 10 through the information transmitting/receiving section 301.

The edit command displaying section 3032 displays on the screen displaying section 304 the content of the edit command that has been received from each of the other editing terminals 30 in the synchronized state, and the content of the edit command that has been generated by the edit command generating section 3031.

Figure 7:
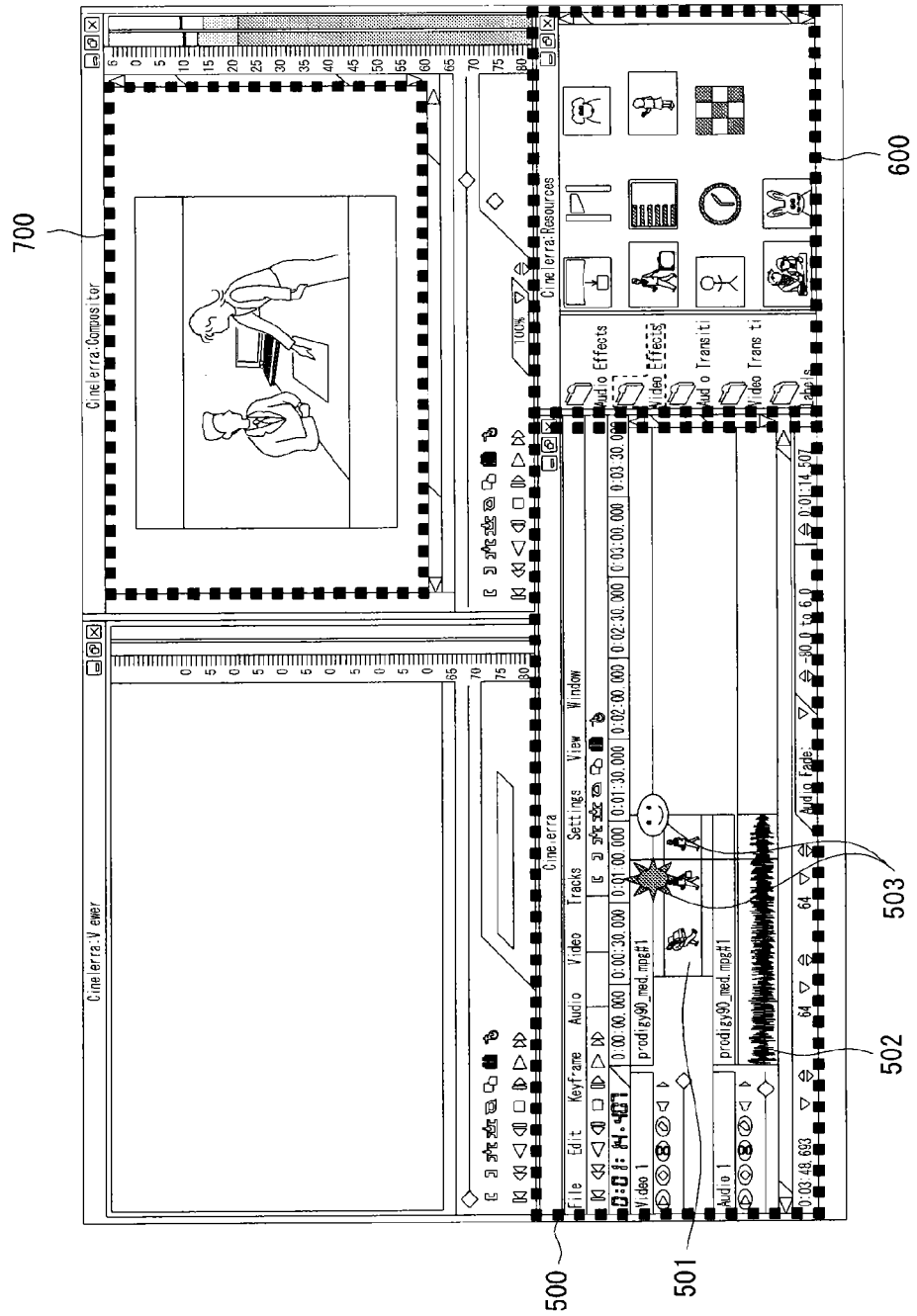
FIG. 7 is a view illustrative of an example of a video editing screen according to an embodiment of the present invention.

FIG. 7 illustrates an example of the video editing screen on which a content of the edit command is displayed under the control of the edit command displaying section 3032. As illustrated in FIG. 7, the video editing screen includes an editing section 500, an edit command selection section 600, and a video displaying section 700. The editing section 500 displays a display 501 for displaying thumbnails which are sets of images included in the video content, a run-time display 502, and the contents of the edit commands 503 such as mosaic, fade-out, or the like. The edit command selection section 600 displays a list of images representing the contents of the edit commands which can be selected by the user. The video displaying section 700 displays an actual video being edited.

In this way, since the content of the edit command transmitted from each of the other editing terminals 30 in the synchronized state is displayed on the video editing screen, the content of the edit command issued for the video content to be edited can be shared between or among the plurality of editing terminals 30 in the synchronized state. This allows each user to learn what kind of editing is being performed by another user of other users performing the simultaneous editing, merely by looking at the video editing screen of the user's own editing terminal 30.

It should be noted that a method of displaying the content of the edit command is not limited the above description, and any kind of image may be used to display the content of the edit command. Moreover, the content of the edit command may be displayed by not only an image but also a text.

The editing application storing section 3033 stores the editing application program which is started up by the editing application start signal or the like. The above described functions of the edit command generating section 3031 and the edit command displaying section 3032 are accomplished by the CPU of the editing terminal 30 performing the process according to the above described editing application program that has been started up, whereby simultaneous editing of a common video content is made available.

It should be noted that a program for an editing engine or editing application program may not be stored in the editing terminal 30 beforehand, and may be downloaded from the video editing server 10 whenever the video editing is to be performed, and the downloaded program may be deleted when the editing is terminated. The download of the program whenever editing is performed in this way has an advantage of achieving editing functions for the video content in the editing terminal 30 without storing the program beforehand in the editing terminal 30.

The information transmitting/receiving section 301 exchanges with the video editing server 10 the video/image data, the edit command for editing the video content, the editing application start signal, the response signal to the editing application start signal, screen information for displaying the video editing screen, and the like.

The video DB 302 receives the video content to be edited, from the video editing server 10, and stores the video content to be edited. The workspace memory 306 temporarily stores the video data to be edited, the edit command based on the editing operation performed by the user, the edit command received from each of the other editing terminals 30, and the like.

(Operations)

Subsequently, operations of the video editing system according to an embodiment of the present invention will be described.

(Operations until Synchronization is Completed)

Figure 5:
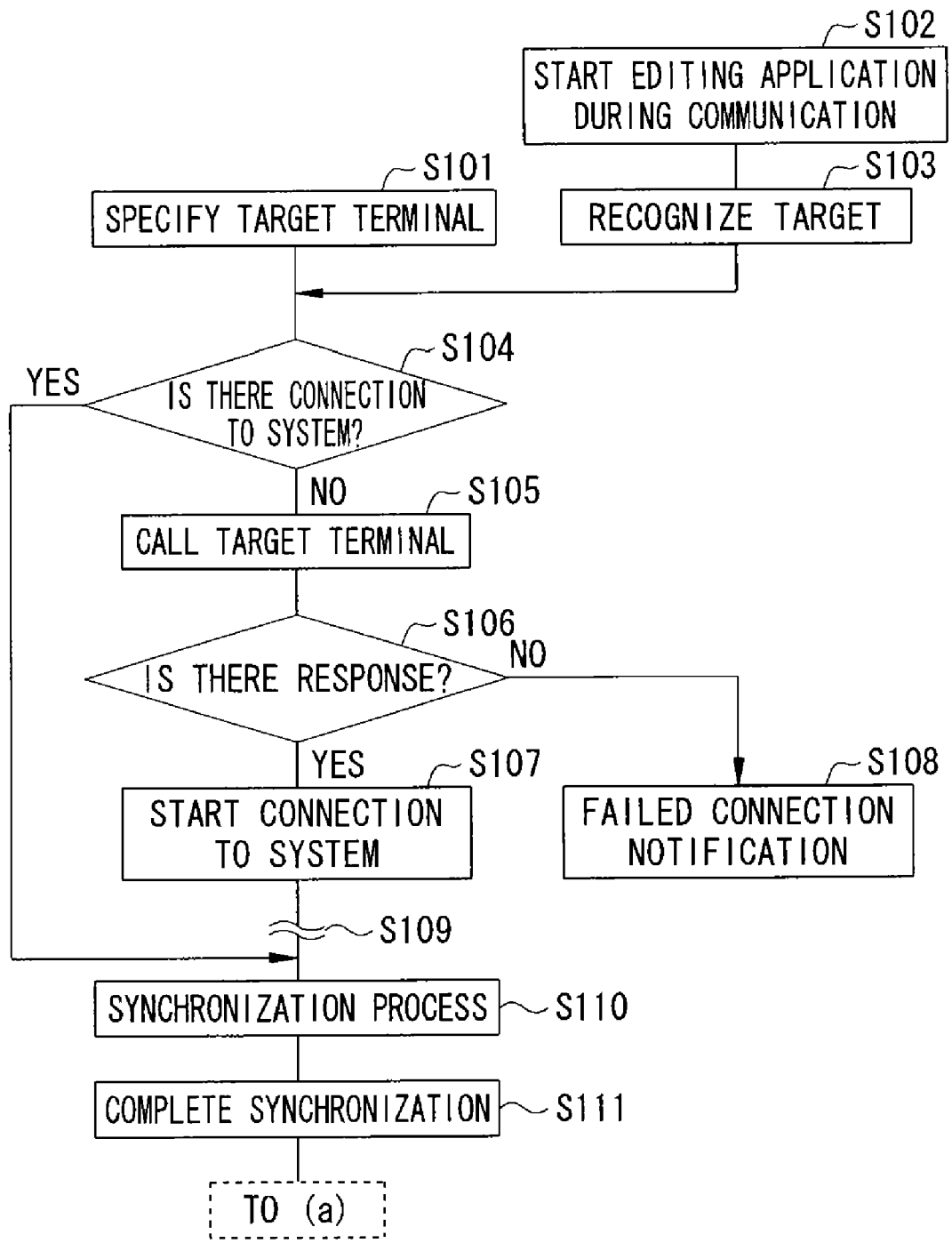
FIG. 5 is a sequence diagram illustrative of operations until synchronization is completed in the video editing system according to an embodiment of the present invention.

Firstly, with reference to FIG. 5, operations until the synchronization is completed in the video editing system will be described.

The editing terminal 30 is connected to the video editing system, and then transmits the identifier of a target editing terminal 30 with which the editing of the common video content is simultaneously attempted, to the video editing server 10 (S101). As conceivable methods of transmitting the identifier of the target editing terminal 30, a user inputs information necessary for starting the simultaneous editing from an input screen, of the target terminal, to be displayed by executing the editing application program, and then the editing terminal 30 transmits the inputted information to the video editing server 10. Alternatively, the editing terminal 30 receives a Web page for inputting the identifier of the target editing terminal 30, from the video editing server 10, so that the user inputs the identifier from the above described Web page, or the like. However, any method with which the video editing server 10 is capable of identifying the target editing terminal 30 uniquely may be employed.

As yet another embodiment, in a case where one of the editing terminals 30 performing audio/video communications via a network such as a mobile communication network initiates the editing application program (S102) and is connected to the video editing system, the video editing server 10 receives the identifier of the editing terminal 30 in communication with the above described connected editing terminal 30, from the above described editing terminal 30, thereby obtaining the identifier of the target editing terminal 30 with which the simultaneous editing is attempted and the communication is being established, without the user's input (S103).

According to steps in S101 to S103, in receipt of the identifier of the target editing terminal 30, the video editing server 10 determines whether or not the target editing terminal 30 is connected to the video editing system by verifying the above-described identifier with the information on the connected terminals stored in the connected client information management section 1033 in the multi-terminal management section 103 (S104). As a result of the verification, when it is determined that the target editing terminal 30 is already connected to the video editing system, it is not necessary to call the target editing terminal 30. Therefore, the processing proceeds to the synchronization step in S110.

Conversely, as a result of the verification, when it is determined that the target editing terminal 30 is not connected, the editing terminal calling section 1031 included in the multi-terminal management section 103 of the video editing server 10 calls the target editing terminal 30 via the network 20 (S105). Specifically, for example, in a case where the network 20 is a mobile communication network, a call control device in the network 20 performs a process of calling the editing terminal 30. After a session with the target editing terminal 30 is established, the video editing server 10 transmits the editing application start signal to the target editing terminal 30.

The process flow is branched depending on whether or not there is a response to the call (S106). When the target editing terminal 30 makes a response, the connection of the target editing terminal 30 to the video editing system is initiated (S107). Conversely, when there is no response to the call for any reason and the connection of the target editing terminal 30 to the video editing system is not completed, the editing terminal 30 which has made the call is notified of it, and the processing is terminated (S108).

When the connection of the target editing terminal 30 to the video editing system is initiated, a process of starting the editing application in the target editing terminal 30 is performed (S109). Authentication, environment determination processing, and the like performed in S109 between the video editing server 10 and the editing terminal 30 are not directly related to the present invention, so details thereof are omitted.

Subsequently, the synchronization process is performed in S110. Specifically, the edit command synchronizing section 1032 of the video editing server 10 transmits to the target editing terminal 30 the edit commands accumulated in the edit command accumulating section 1034 until the target editing terminal 30 is connected to the video editing system, and the screen information for displaying the video editing screen on which the video content is edited.

In receipt of the accumulated edit commands and the screen information from the video editing server 10, the edit command displaying section 3032 of the target editing terminal 30 displays the video editing screen on which the contents of the edit commands 503 accumulated until the connection to the video editing system is completed are displayed, for example, as illustrated in FIG. 7. Therefore, if no edit command has been accumulated in the edit command accumulating section 1034 because the editing operation for the video content has not been initiated until the target editing terminal 30 is connected or the like, the synchronization process is completed at a time point of S109.

When displaying the video editing screen, on which the contents of the edit commands have been displayed and completing the synchronization process, the target editing terminal 30 notifies the video editing server 10 of the completion of the synchronization process. The video editing server 10 which has received the completion notification recognizes that the editing terminal 30 is in the synchronized state, and registers its information in the connected client information management section 1033 of the multi-terminal management section 103 (S111).

(Operations for Simultaneous Video Editing)

Figure 6:
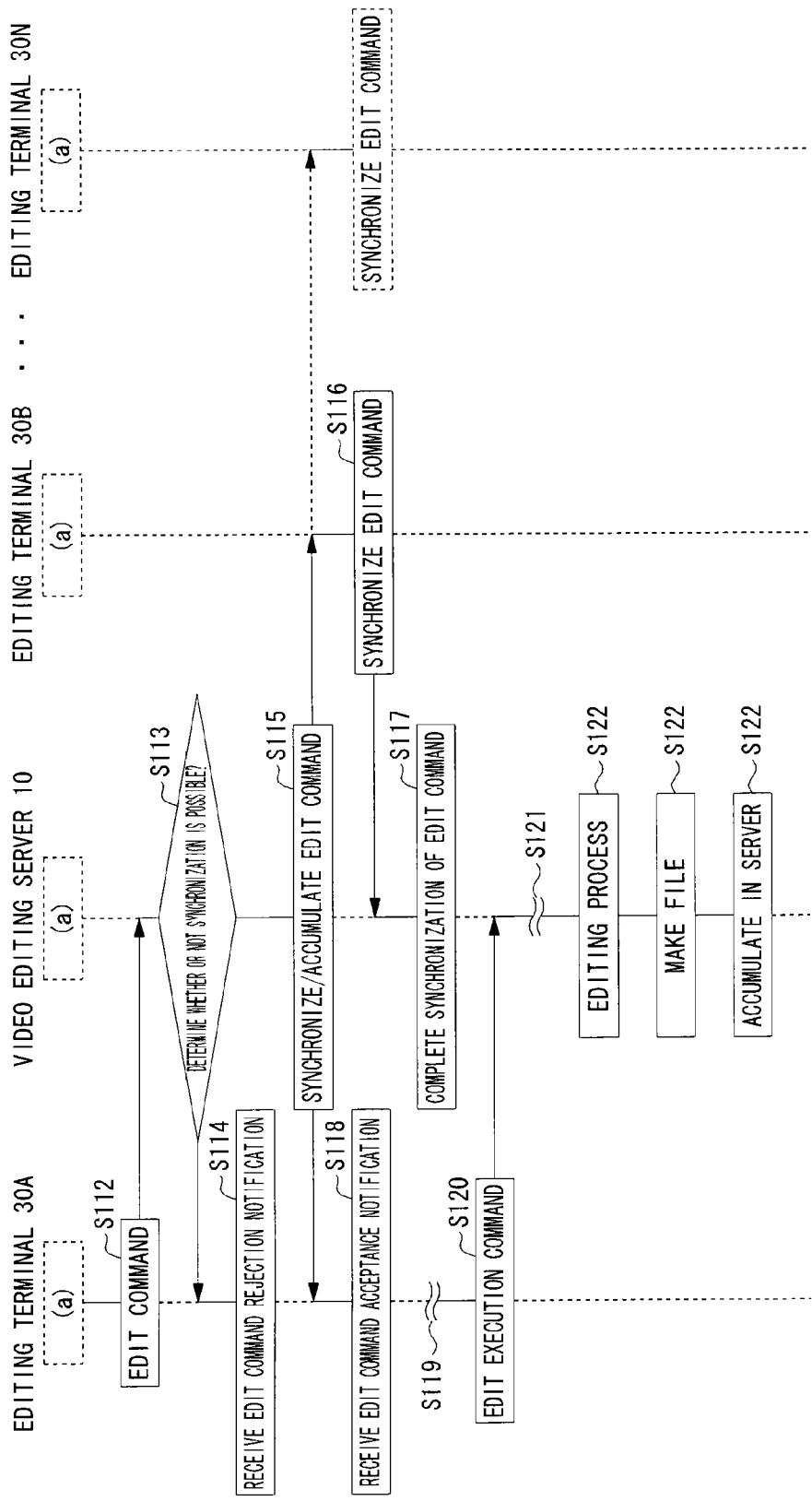
FIG. 6 is a sequence diagram illustrative of operations in which the editing terminals simultaneously edit a common video content, and the video editing server stores the video content in which an edited content has been reflected, according to an embodiment of the present invention.

Subsequently, with reference to FIG. 6, a description will be given of operations in which the editing terminals 30A, 30B, . . . , 30N in the synchronized state simultaneously perform the editing operations for editing the common video content, and the video editing server 10 reflects the edited content and stores the video content.

When the user performs the editing operation for editing the terminal operating section 305, the editing terminal 30A generates the edit command with the edit command generating section 3031, and transmits the generated edit command to the video editing server 10 via the information transmitting/receiving section 301 (S112).

In receipt of the edit command via the information transmitting/receiving section 101, the video editing server 10 processes the edit command in the video editing section 102 and in the multi-terminal management section 103, respectively. Specifically, the edit command synchronizing section 1032 in the multi-terminal management section 103 determines whether or not the edit command can be synchronized (S113). This determination process is performed for preventing the inconsistency in the edit command among the plurality of editing terminals 30 based on the predefined editing rule. Alternatively, this determination process is performed for suppressing a command from the editing terminal 30 that does not have the editing authority, if the plurality of editing terminals 30 alternately edits the video content and the editing terminal 30 having the editing authority to edit the video content is alternately switched between or among the plurality of editing terminals 30. This determination process is provided for performing smooth simultaneous editing operations. When it is determined that the synchronization process cannot be performed and then an edit command is rejected, the video editing server 10 transmits a rejection notification to the editing terminal 30A which has transmitted the edit command (S114). In a case where no problem will occur in performing the synchronization process, such as a case where the edit command is received from the editing terminal 30 having the editing authority, the edit command synchronizing section 1032 of the video editing server 10 performs the synchronization process by transmitting the edit command to the other editing terminals 30B, . . . , 30N in the synchronized state. Simultaneously, the edit command synchronizing section 1032 notifies the editing terminal 30A which has transmitted the edit command that the edit command has been accepted. In addition, the video editing server 10 performs a process of accumulating the received edit command in the edit command accumulating section 1034 (S115).

The edit command displaying section 3032 of each of the other editing terminals 30B, . . . , 30N, which has received the edit command, performs the synchronization process by displaying the content of the received edit command on the video editing screen, and notifies the video editing server 10 that the synchronization process has been completed (S116).

The video editing server 10, upon receipt of the synchronization completion notifications from the other editing terminals 30B, . . . , 30N, recognizes that the synchronization of the edit commands is completed (S117). When the synchronization completion notifications is not received and it is recognized that the synchronization of the edit command is not completed, the video editing server 10 attempts to perform the synchronization by periodically transmitting the edit commands to the other editing terminals 30B, ..., 30N via the edit command synchronizing section 1032, or the like.

The editing terminal 30A, which has been notified by the video editing server 10 that the edit command has been accepted, performs a process of displaying the edit command acceptance notification on the screen or the like (S118).

According to the above described steps in S112 to S118, the synchronization process for a set of edit commands based on one-time editing operation performed by the user is terminated.

Under the assumption of an actual video editing operation, the steps in S112 to S118 are repeatedly performed, and any number of the edit commands based on any number of editing operations performed by the user are accumulated in the workspace memory 306 of the editing terminal 30A (S119).

When a user desires to view the video content in which the accumulated edit commands are reflected, or when a user desires to make a file of the video content in which the accumulated edit commands are reflected, or the like, the user performs an operation of instructing such a desire, from the terminal operating section 305. Thereby, the editing terminal 30A transmits an edit execution command to the video editing server 10 via the information transmitting/receiving section 301 (S120).

The video editing server 10 which has received the edit execution command determines whether or not the process can be performed, and performs processes accompanied with the determination, similarly to the processes described in S113 to S118 (S121). Then, the video editing server 10 performs the editing process for the video content, makes the file of the edited video content, and performs the accumulation and the like (S122). It should be noted that a process in S122 is not directly related to the present invention, so the details thereof are omitted.

As described heretofore, since the content of the edit command that has been transmitted from each of the other editing terminals 30 in the synchronized state can be displayed on the plurality of editing terminals 30 in the synchronized state, the user of the editing terminal 30 is able to learn what kind of editing is being performed by the other users who are simultaneously editing the video content, without generating a file in which the content of the editing has been reflected in the video content. Therefore, the simultaneous editing of the video content to be performed by a plurality of persons is enabled.

Moreover, the video editing server 10 transmits the call request to the editing terminal 30 to be brought into the synchronized state, is connected to the above described editing terminal 30, transmits a history of the edit commands accumulated in the edit command accumulating section 1034, to the above described newly connected editing terminal 30, whereby the newly connected editing terminal is brought into the synchronized state. Therefore, the user is able to perform the simultaneous editing operation for editing the video content even in the middle of the simultaneous editing operation, without having the editing terminal 30 constantly connected to the video editing system.

The present invention is applicable to the simultaneous editing of the common video content to be performed by a plurality of communication terminals.

What is claimed is:

1. A video editing system comprising:
   a plurality of communication terminals connected to the video editing system in a synchronized state and simultaneously capable of editing a common video content via a video editing interface; and
   a video editing server for controlling editing of the common video content to be performed by the plurality of communication terminals, wherein each one of the plurality of communication terminals comprises:
   an edit command generating section for generating an edit command for editing the common video content;
   an information transmitting/receiving section for transmitting the edit command generated by the edit command generating section to the video editing server, and for receiving the edit command for editing the common video content from another communication terminal in the synchronized state, via the video editing server; and
   an edit command displaying section for displaying the edit command received by the information transmitting/receiving section on the common video content, and wherein
   the video editing server comprises:
   a common video content editing section for receiving the edit command for editing the common video content, and performing an editing process for editing the common video content with the received edit command;
   a connected client information management section for managing identifiers for respectively identifying the plurality of communication terminals connected to the video editing system in the synchronized state and simultaneously capable of editing the common video content;
   a synchronization permission determining section for determining whether or not the received edit command can be synchronized based on a predefined editing rule, by referring to the identifiers for respectively identifying the plurality of communication terminals connected to the video editing system in the synchronized state and simultaneously capable of editing the common video content; and
   an edit command synchronizing section for, upon reception of the edit command for editing the common video content from one of the plurality of communication terminals, simultaneously transmitting the edit command to all of the communication terminals connected to the video editing system in the synchronized state and simultaneously capable of editing the common video content.

2. A communication terminal that is one of a plurality of communication terminals and that edits a common video content via a video editing interface in the video editing system according to claim 1, the communication terminal comprising:
   an edit command generating section that generates an edit command for the common video content;
   an information transmitting/receiving section that transmits the edit command generated by the edit command generating section to a video editing server, and that receives the edit command for editing the common video content from another communication terminal in the synchronized state, via the video editing server; and
   an edit command displaying section that displays a content of the edit command received by the information transmitting/receiving section.

3. The communication terminal according to claim 2, wherein:
   the information transmitting/receiving section receives a call request from the video editing system, when the communication terminal is not connected to the video editing system for relaying the editing of the common video content to be performed by the plurality of communication terminals; and a connection to the video editing system is initiated by making a response to the call request received by the information transmitting/receiving section.

4. The communication terminal according to claim 2, wherein:
when the communication terminal is connected to the video editing system in order to edit the common video content while another communication terminal out of the plurality of communication terminals is editing the common video content, the information transmitting/receiving section receives from the video editing system the edit command, for editing the common video content, which has been transmitted from said another communication terminal until the communication terminal is connected to the video editing system.

5. A video editing server that relays a communication between a plurality of communication terminals connected to the video editing system in a synchronized state and simultaneously capable of editing a common video content via a video editing interface, the video editing server comprising:
a common video content editing section for receiving an edit command for editing the common video content, and performing an editing process for editing the common video content with the received edit command;
a connected client information management section for managing identifiers for respectively identifying the plurality of communication terminals connected to the video editing system in the synchronized state and simultaneously capable of editing the common video content;
a synchronization permission determining section for determining whether or not the received edit command can be synchronized based on a predefined editing rule, by referring to the identifiers for respectively identifying the plurality of communication terminals connected to the video editing system in the synchronized state and simultaneously capable of editing the common video content; and
an edit command synchronizing section for, upon reception of the edit command for editing the common video content from one of the plurality of communication terminals, simultaneously transmitting the edit command to all of the communication terminals connected to the video editing system in the synchronized state and simultaneously capable of editing the common video content.

6. The video editing server according to claim 5, further comprising an editing terminal calling section for transmitting a call request to a communication terminal which is not connected to the video editing server and which is to be brought into the synchronized state,
wherein a connection to the communication terminal is initiated by receiving a response to the call request from the communication terminal.

7. The video editing server according to claim 5, further comprising an edit command accumulating section for accumulating the edit commands received from the plurality of communication terminals connected to the video editing system in the synchronized state and simultaneously capable of editing the common video content,
wherein when a communication terminal attempting to edit the common video content is newly connected while the plurality of communication terminals connected to the video editing system in the synchronized state and simultaneously capable of editing the common video content are editing the common video content, the edit command synchronizing section brings the newly connected communication terminal into the synchronized state by transmitting to the newly connected communication terminal the edit command, for editing the predetermined common video content, which has been accumulated in the edit command accumulating section.

8. The video editing server according to claim 5, wherein:
when the edit command synchronizing section transmits the edit command to all of the plurality of communication terminals connected to the video editing system in the synchronized state and simultaneously capable of editing the common video content and edit command synchronizing section is not capable of performing a synchronization process of causing all of the plurality of communication terminals connected to the video editing system in the synchronized state and simultaneously capable of editing the common video content to display the edit command, the edit command synchronizing section retransmits the edit command until the synchronization process is normally performed.

9. The video editing server according to claim 5, wherein the edit command synchronizing section determines whether or not the synchronization process is performed based on the predefined editing rule, when the edit command is received from one of the plurality of communication terminals connected to the video editing system in the synchronized state and simultaneously capable of editing the common video content.

10. The video editing server according to claim 9, wherein the predefined editing rule includes at least one of editing rules:
an editing rule in which, in a case where the plurality of communication terminals connected to the video editing system in the synchronized state and simultaneously capable of editing the common video content alternately edit the common video content and the communication terminal having an editing authority to edit the common video content is alternately switched between the plurality of communication terminals, it is determined that the synchronization process is performed when a communication terminal which has transmitted the edit command does not have the editing authority at a time point when the communication terminal transmits the edit command; and
another editing rule in which it is determined that the synchronization process cannot be performed when the plurality of communication terminals connected to the video editing system in the synchronized state and simultaneously capable of editing the common video content and an inconsistency occurs, if two edit commands are simultaneously received and both of the two edit commands are reflected.

* * * * *